United States Patent [19]

Kurihara et al.

[11] Patent Number: 4,950,914
[45] Date of Patent: Aug. 21, 1990

[54] COLLISION DETECTION SYSTEM FOR A VEHICLE

[75] Inventors: Norimitsu Kurihara; Yoshikazu Tsuchiya; Makie Morota; Junichi Fukuda, all of Wako, Japan

[73] Assignee: Honda Giken Kogyo Kabushiki Kaisha, Tokyo, Japan

[21] Appl. No.: 174,555

[22] Filed: Mar. 29, 1988

[30] Foreign Application Priority Data

Mar. 30, 1987 [JP] Japan .................................. 62-74477
Oct. 16, 1987 [JP] Japan ................................. 62-259641

[51] Int. Cl.$^5$ ........................................... B60R 21/08
[52] U.S. Cl. .................................... 307/10.1; 307/9.1; 310/329; 73/35; 280/735; 180/274
[58] Field of Search ...................... 307/10, 9; 340/466, 340/467, 457, 457.7, 429, 436, 437, 438; 180/268, 270, 271, 272, 273, 282, 283, 274, 287; 280/734–736; 73/517 R, 35; 310/311, 317, 315, 319, 324, 326, 329

[56] References Cited

U.S. PATENT DOCUMENTS

| 2,808,522 | 10/1957 | Dranetz . | |
| 3,045,131 | 7/1962 | Orlacchio . | |
| 3,093,759 | 6/1963 | Orlacchio . | |
| 3,120,622 | 2/1964 | Dranetz et al. . | |
| 3,170,076 | 2/1965 | Wing . | |
| 3,851,305 | 11/1974 | Baba et al. . | |
| 3,911,391 | 10/1975 | Held et al. .......................... | 280/735 |
| 3,964,016 | 6/1976 | Yamada et al. .................... | 280/753 X |
| 4,337,641 | 7/1982 | Sugihara et al. ................... | 73/35 |
| 4,346,913 | 8/1982 | Schrauf et al. ..................... | 280/735 |
| 4,371,804 | 2/1983 | Peng et al. .......................... | 73/35 X |
| 4,410,875 | 10/1983 | Spies et al. ......................... | 180/274 X |
| 4,562,740 | 1/1986 | Webber et al. ..................... | 73/35 X |
| 4,630,465 | 12/1986 | Hatton ................................. | 73/35 |
| 4,658,650 | 4/1987 | Yorinaga et al. ................... | 310/329 X |
| 4,660,410 | 4/1987 | Asano et al. ....................... | 310/329 X |
| 4,672,839 | 6/1987 | Takeuchi et al. .................. | 310/329 X |
| 4,704,894 | 11/1987 | Inuzuka et al. .................... | 73/35 |
| 4,727,279 | 2/1988 | Peng ................................... | 310/329 |

Primary Examiner—William M. Shoop, Jr.
Assistant Examiner—Paul Ip
Attorney, Agent, or Firm—Armstrong, Nikaido, Marmelstein, Kubovcik & Murray

[57] ABSTRACT

A collision detection system for a vehicle comprising an acceleration sensor for sensing the acceleration and deceleration of the vehicle wherein the acceleration sensor is a piezoelectric sensor; signal processing circuit coupled to the piezoelectric sensor for generating a first output when the vehicle deceleration is greater than a predetermined amount. A diagnostic pulse generator is coupled to the piezoelectric sensor for applying a diagnostic pulse to the piezoelectric sensor for distorting the piezoelectric sensor, thereby causing the piezoelectric sensor to generate an electrical output. The electrical output is applied to the signal processing circuit wherein the signal processing circuit produces a second output in response thereto. The piezoelectric sensor is mounted on a pendulum such that when the vehicle accelerates or decelerates, the pendulum moves relative to the vehicle thereby distorting the piezoelectric sensor whereby the piezoelectric sensor produces an output as a function of the distortion. The piezoelectric sensor includes an electrode which is divided into a plurality of electrode segments. At least one of the electrode segments is an output electrode for providing an electrical signal as a function of the distortion of the piezoelectric sensor and at least one of the electrode segments is an input electrode for receiving an electrical signal and distorting the piezoelectric sensor in response thereto.

13 Claims, 2 Drawing Sheets

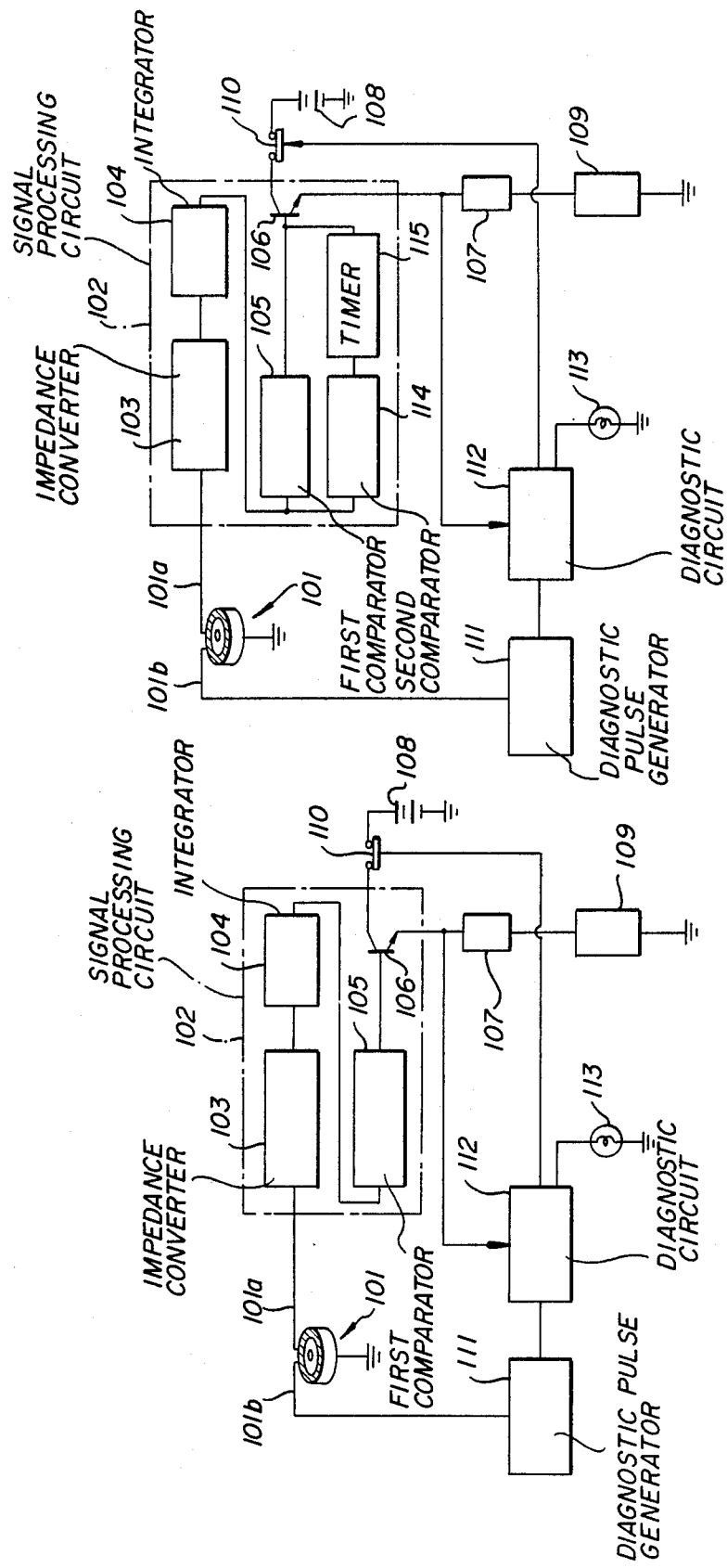

COLLISION DETECTION SYSTEM FOR A VEHICLE

BACKGROUND OF THE INVENTION

1. Field of the Invention

The present invention relates to a collision detection system used for an airbag system or the like in a vehicle. The present invention also relates to an acceleration sensor for use with a moving object such as a vehicle for detecting the acceleration or deceleration of the moving object and more particularly, to a piezoelectric acceleration sensor comprising a pendulum supported for movement relative to a housing which is fixed to the moving object and a piezoelectric element which detects the displacement of the pendulum relative to the moving object to generate a voltage in proportion to the relative displacement. The term "acceleration sensor" as used herein refers to a sensor which senses both acceleration and deceleration.

2. Description of the Prior Art

Automobiles are required to be as simple as possible in maneuravability and yet provide pleasurable driving and these demands necessitate ingenious controls for various parts of the automobile. Recent advanced electronic control techniques have been introduced to the automobile industry. It is necessary for the control of the automobile to have operational data such as the vehicle running state and operational states of various parts of engine, and thus, various sensors are provided on a vehicle for this purpose.

A prior art collision detection system, as disclosed in U.S. Pat. No. 4,164,263, comprises an acceleration sensor which uses a strain gauge pickup and a signal processing circuit connection to the output of the acceleration sensor, wherein in operation, if the acceleration sensor detects an acceleration greater than a preset value due to the collision of the vehicle, the signal processing circuit produces an output to activate a security device such as an airbag.

The conventional collision detection system, including the acceleration sensor itself, must undergo an inspection for abnormalities such as the failure of the acceleration sensor and/or wire breakage in the signal processing circuit. This inspection is performed by applying a mechanical vibration to the acceleration sensor and measuring the output of the signal processing circuit with an instrumentation apparatus. However, this diagnostic procedure to the collision detection system is too intricate for the vehicle user to carry out.

Acceleration sensors for detecting the acceleration of moving objects are broadly classified into the following types: the piezoelectric type, dynamic electric type, servo type, and strain gauge type. Among these types of sensors, the piezoelectric sensor is most commonly used in the field of general acceleration measurement, and the other types of sensors are used mainly in special instrumentation fields.

A typical piezoelectric acceleration sensor consists of a pendulum movably supported relative to a housing which is fixed to a moving object under measurement and a piezoelectric element having a face joined to the pendulum. The sensor operates such that the piezoelectric element is distorted in response to the displacement of the pendulum, resulting in the generation of a voltage in proportion to the acceleration of the moving object.

The use of such a piezoelectric acceleration sensor is exemplified by the operation circuit of an airbag system, as disclosed in Japanese Patent Publication No. 58-22377. This piezoelectric acceleration sensor is designed to detect the deceleration of a vehicle and produce a voltage signal in response to the deceleration in excess of a preset value. The signal ignites a detonator in the airbag system so that the airbag is inflated to hold a passenger in the seat.

The foregoing conventional piezoelectric acceleration sensor functions solely to detect the acceleration and thus, for inspection of the sensor a mechanical vibration or impact must be applied to the sensor by means of a special test device such as a vibrator. Generally, this kind of test device is too bulky to be provided in average automobiles such as passenger cars. Therefore, the car user is obliged to detach the sensor from the vehicle and take it for inspection to a specific facility equipped with a diagnostic vibrator.

SUMMARY OF THE INVENTION

It is the primary object of the present invention to provide a vehicle collision detection system which incorporates a diagnostic function for automatically detecting abnormalities in the system.

The present invention has for another of its primary objects, to provide a piezoelectric acceleration sensor which allows easy inspection at an time while it is in the vehicle.

In order to achieve the above objects, the vehicle collision detection system of the present invention includes an acceleration sensor and a signal processing circuit connected to the output of the acceleration sensor, wherein the acceleration sensor comprises a piezoelectric pickup element and the system further comprises a diagnostic pulse generator which provides diagnostic pulses to the piezoelectric element so that it distorts and then yields a piezoelectric effect voltage, and a diagnostic circuit which detects the output of the signal processing circuit.

When the piezoelectric element receives a diagnostic pulse, it creates a distortion attributable to the inverse piezoelectric effect and in consequence, generates an output voltage. This voltage causes the signal processing circuit to produce an output signal. If at least one of the piezoelectric element and signal processing circuit is faulty, the signal processing circuit fails to produce the output signal. Accordingly, by detecting the output signal of the signal processing circuit in response to the generation of the diagnostic pulse from the diagnostic pulse generator, the collision detection system can be automatically inspected.

The piezoelectric acceleration sensor of the present invention has its piezoelectric element electrode divided into a plurality of segments, some of which function as output terminals for outputting a voltage signal proportional to the acceleration, with the remaining segments function as input terminals for receiving a diagnostic voltage signal.

When the moving body accelerates, the pendulum in the sensor is displaced relative to the moving body, causing the piezoelectric element to distort and generate a voltage in proportion to the acceleration which is applied to the output terminal. The acceleration is thus detected by the sensor.

When a diagnostic voltage signal is applied to the sensor input terminal, the piezoelectric element creates a distortion in proportion to the input voltage if the sensor is normal. This is equivalent to the state of distortion of the piezoelectric element attributable to the vibratory acceleration of the pendulum in the sensor. The piezoelectric element generates a voltage in proportion to the distortion, and a voltage signal with a predetermined amplitude depending on the diagnostic voltage signal is produced on the output terminal. Accordingly, the normality of the sensor is detected on the basis of the voltage signal.

If, on the other hand, the sensor if faulty, it does not produce a voltage signal with the predetermined amplitude dependent on the input diagnostic voltage signal or it does not produce an output voltage at all on the output terminal. Accordingly, the abnormality of the sensor is detected on the basis of the output voltage signal.

The inventive piezoelectric acceleration sensor thus includes an acceleration sensing function and a self-diagnostic function for detecting the abnormality of the sensor itself.

BRIEF DESCRIPTION OF THE DRAWINGS

FIG. 1 is a schematic diagram of an embodiment of the present invention.

FIG. 2 is a schematic diagram of a modified embodiment of the invention.

DETAILED DESCRIPTION OF THE PREFERRED EMBODIMENTS

Figure 5:
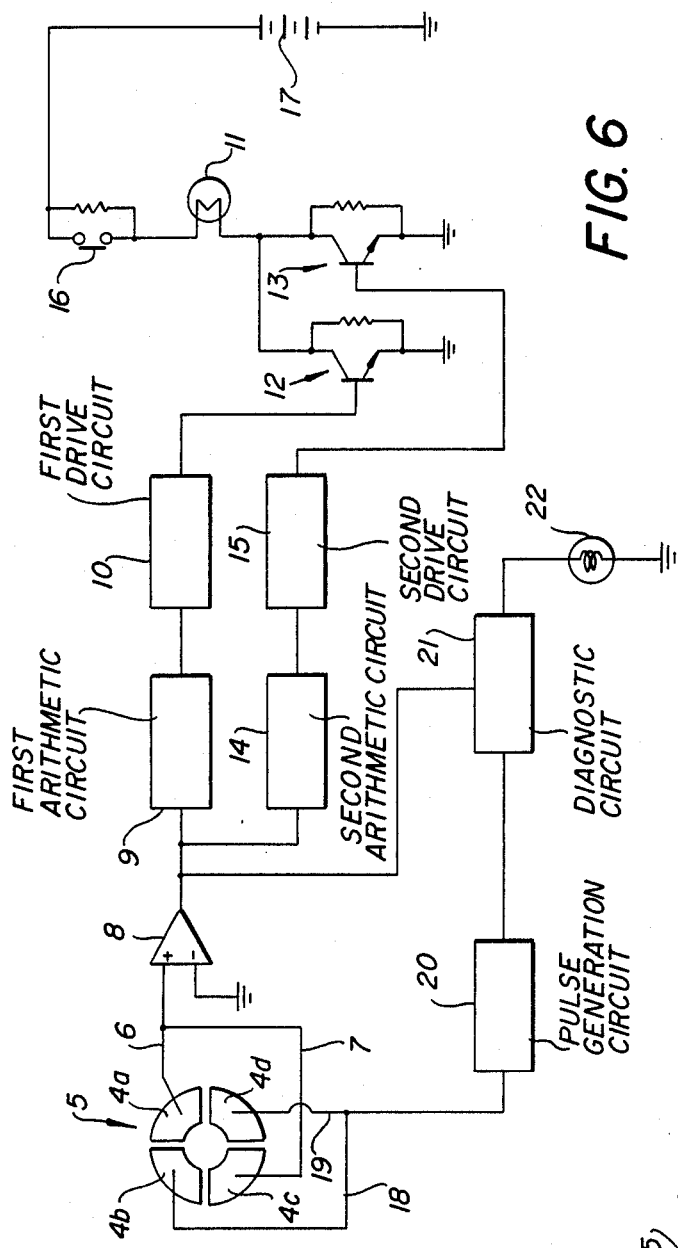
FIG. 5 is a schematic diagram showing a piezoelectric acceleration sensor and a self-diagnostic circuit included in an airbag operation circuit for a vehicle.

The accompanying drawings show embodiments of the present invention, where the collision detection system is applied to an airbag system of a vehicle.

In FIG. 1, a piezoelectric pickup element 101 functions as an acceleration sensor, a signal processing circuit 102 is connected to the output of the piezoelectric element 101. The circuit 102 includes an impedance converter 103 connected to the output terminal 101a of the piezoelectric element 101, an integrator 104 connected to the output of the impedance converter 103, a first comparator 105 which produces a high-level signal when the output voltage of the integrator 104 is above a preset threshold voltage, and a transistor 106 which becomes conductive in response to the high-level output signal from the first comparator 105. The transistor 106 has its collector connected in a detonator ignition circuit which connects a detonator 107 for airbag activation to a battery 108.

In operation, when a collision of the vehicle occurs, the moving part in the acceleration sensor applies an impact to the piezoelectric element 101, which then produces an output voltage. The voltage signal is processed by the impedance converter 103, integrator 104 and first comparator 105 and the resulting signal switches the transistor 106 to a conductive state, causing the detonator 107 to be ignited.

The piezoelectric element 101 may be designed to serve as the inertia mass itself so that the acceleration sensor comprises only the piezoelectric element 101. The arrangement of Figure 1 further includes a mechanical acceleration sensor 109 having contacts and a fail-safe relay 110, inserted in series in the air bag ignition circuit with the intention of preventing the erroneous activation of a detonator.

The piezoelectric element 101 has an input terminal 101b for effecting an inverse piezoelectric effect by applying a diagnostic pulse from a diagnostic pulse generator 111. The signal processing circuit 102 has its output, i.e., the conductive state of the transistor 106, detected by a diagnostic circuit 112, which operates the fail-safe relay 110 and also an alarm device 113 such as a lamp.

The diagnostic pulse generator 111 is designed to generate diagnostic pulses during a cranking operation when the vehicle is parked as recognized from the vehicle speed signal, cranking signal and parking brake signal, for example. When a diagnostic pulse is applied to the input terminal 101b, the piezoelectric element 101 produces an output voltage on the output terminal 101a derived from the inverse piezoelectric effect. The frequency and voltage of the diagnostic pulses are set such that the integrator 104 produces a voltage higher than the threshold voltage V1 of the first comparator 105.

As long as the piezoelectric element 101 and signal processing circuit 102 are operating normally, generation of a diagnostic pulse causes the transistor 106 to become conductive, so that the voltage of the battery 108 is applied to the diagnostic circuit 112. If, on the other hand, the battery voltage is not applied to the diagnostic circuit 112 on expiration of a certain time length after the diagnostic pulse has been generated, the system detects the occurrence of failure, and then deenergizers the fail-safe relay 110 and activates the alarm device 113. Since the diagnostic pulses are generated when the vehicle is parked, the mechanical acceleration sensor 109 has its contacts kept open, and the detonator 107 is never ignited.

FIG. 2 shows another embodiment of the present invention, in which diagnostic pulses are generated when the contacts of mechanical acceleration sensor 109 can possibly close while the vehicle is running. In this embodiment of the signal processing circuit 102, a serial circuit of a second comparator 114 and a timer (monostable multivibrator) 115 is connected in parallel to the first comparator 105, with a threshold voltage V2 lower than V1 for the first comparator being set in the second comparator 114. The frequency and voltage of diagnostic pulses are set such that the integrator 104 produces an output voltage V in the range V2<21 V<21 V1 and the timer 115 is designed to produce the output pulse width shorter than the time length necessary for the ignition of the detonator 107.

In operation, a diagnostic pulse is applied to the piezoelectric element 101, and when its output voltage causes the integrator 104 to produce an output voltage in excess of the threshold voltage V2 of the second comparator 114, the timer 115 produces an output pulse, causing the transistor 6 to become conductive for the specified duration, and the diagnostic operation by the diagnostic circuit 112 takes place. In this case, even if the mechanical acceleration sensor 109 has its contacts closed, the transistor 106 is cut off before the detonator 107 is ignited.

A relay switch which is opened at the generation of diagnostic pulses may be inserted in the detonator ignition circuit for the sake of preventing the detonator 107 from being activated erroneously.

According to the present invention, as described above, the acceleration sensor and associated signal processing circuit can be inspected automatically, whereby the reliability of the collision detection system is enhanced. The diagnostic system is completed merely by addition of a diagnostic pulse generator and a diagnostic circuit which detects the output of the signal processing circuit, and yet it is simple in structure and inexpensive.

Another aspect of the present invention includes the structure of the piezoelectric sensor.

Figure 4:
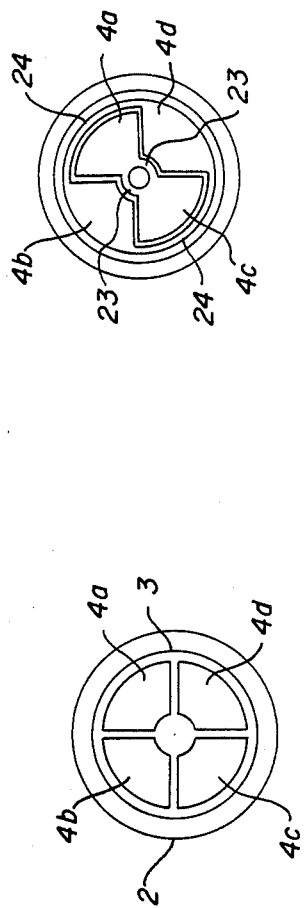
FIG. 4 is a plan view of the piezoelectric acceleration sensor seen along the direction of arrow A in FIG. 3.
Figure 3:
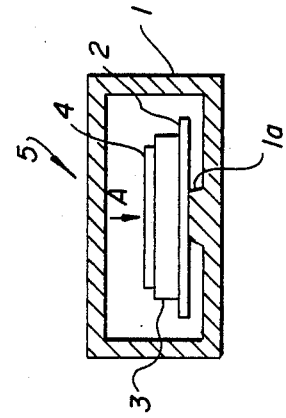
FIG. 3 is a vertical cross-sectional view of the piezoelectric acceleration sensor of one embodiment of the present invention.

Referring to FIG. 3, a cylindrical housing 1 made of metal or conductive resin has a base 1a at the center of the bottom of the housing on which is mounted a disc-shaped pendulum 2 with support means at its center. The outer circumference of the pendulum 2 is free from constriction, thereby allowing it to be displaced relative to the housing 1 in response to a bending deformation of the pendulum 2. The pendulum 2 is fixed to a surface of a piezoelectric element 3 which is formed of piezoelectric ceramics. The piezoelectric element 3 has another surface with a thin electrode 4 made of silver fixed thereto. As shown in Figure 4, the electrode structure 4 is divided into four segments, and these first to fourth electrode segments 4a–4d are insulated from one another. These elements comprise a piezoelectric acceleration sensor 5 of the present invention.

FIG. 5 is a schematic diagram showing an airbag operation circuit intended for automobiles, in which the foregoing piezoelectric acceleration sensor 5 of the present invention and associates self-diagnostic circuit are incorporated. As shown in FIG. 5, the first and third electrodes 4a and 4c are connected to a first and second output wires 6 and 7, which are connected together to the non-inverting input terminal of an amplifier 8. The amplifier 8 has its output terminal connected to a first arithmetic circuit 9 within the airbag operation circuit. The output of the arithmetic circuit 9 is connected to a first drive circuit 10, whose output is connected to the base of a first transistor 12 which functions as the first switch for an airbag inflator 11. The inflator 11 is further provided with a second transistor 13 which functions as a second switch connected in parallel to the first transistor 12. The output of the amplifier 8 is further connected through a second arithmetic circuit 14 and second drive circuit 15 to the base of the second transistor 13. The inflator 11 is connected to a power source 17 through a third switch 16 which is operated by a mechanical acceleration sensor sensitive to the acceleration by means of an inertia member, for example.

The first and second arithmetic circuits 9 and 14 are designed to provide output signals for the first and second drive circuits 10 and 15, respectively, upon receiving the output of amplifier 8 reflecting an extremely large deceleration as would be experienced at the occurrence of vehicle collision. Whereas, normally when the amplifier 8 provides a relatively small output, the arithmetic circuits 9 and 14 produce no output signals.

The sensor 5 has its second and fourth electrodes 4b and 4d connected to first and second input wires 18 and 19, which are connected together to a pulse generation circuit 20. The pulse generation circuit 20 has another connection to a diagnostic circuit 21, which is connected to the output terminal of the amplifier 8. The output of the diagnostic circuit 21 is connected to an indicator lamp 22.

The housing 1 of the piezoelectric acceleration sensor 5 is fixed to the vehicle body, so that the pendulum 2 in the sensor 5 is grounded through the housing 1 to the vehicle body.

Next, the operation of the airbag operation circuit incorporating the piezoelectric acceleration sensor based on this embodiment will be described. When the vehicle starts running, the pendulum 2 in the sensor 5 is displaced relative to the housing 1 in proportion to the acceleration of the vehicle. The relative displacement of the pendulum 2 causes the piezoelectric element 3 to distort proportionally, and it generates a voltage in proportion to the magnitude of distortion on the first and third electrodes 4a and 4c that function as the output terminal of the sensor 5. Since the first and third electrodes 4a and 4c are located opposing each other, they provide an averaged output voltage, i.e., a more accurate voltage signal.

In this way, the acceleration of the vehicle is detected by the piezoelectric acceleration sensor 5. The output signal provided by the first and third electrodes 4a and 4c is applied through the first and second output wires 5 and 7 to the noninverting input terminal of the amplifier 8 for amplification. The amplifier signal is then applied to the first and second arithmetic circuits 9 and 14.

When the vehicle acceleration is smaller than a predetermined value, the amplifier 8 produces a small output, causing both arithmetic circuits 9 and 14 to produce no output signals, and the airbag is not activated.

If the vehicle makes an extreme deceleration in excess of the predetermined value due to a collision or the like, the sensor 5 provides an extremely large output signal. The arithmetic circuits 9 and 14 respond to this large input and produce output signals, by which the respective drive circuits 10 and 15 are operated to switch the first and second transistors 12 and 13 to a conductive state, i.e., the first and second switches are closed.

The mechanical acceleration sensor also responds to such an extreme deceleration of vehicle, and it closes the third switch 16. Then, the complete circuit of the inflator 11 is closed, and consequently, it ignites the detonator to inflate the airbag (not shown) so that the passenger is held in the seat.

The airbag operation circuit consists of two circuit systems in parallel, one including the first arithmetic circuit 9, first drive circuit 10 and first transistor 12, the other including the second arithmetic circuit 14, second drive circuit 15 and second transistor 13. This redundant signal circuit arrangement following the piezoelectric acceleration sensor 5 ensures the action of the airbag even if a circuit of one system fails.

In addition, even if any of the first, second and third switches are closed by some abnormal cause, the circuit of inflator 11 is not closed and the airbag is prevented from inflating erroneously.

For the inspection of the piezoelectric acceleration sensor 5, the pulse generation circuit 20 is operated to supply a diagnostic pulse signal to the second and fourth electrodes 4b and 4d of sensor assigned to the input of the diagnostic pulse signal. When the sensor 5 is operating normally, the piezoelectric element 3 distorts upon receiving the pulse signal. This is equivalent to the application of a mechanical force to the piezoelectric element 3. Accordingly, the piezoelectric element 3 generates a voltage in proportion to the created distortion. The piezoelectric voltage is fed from the sensor through the first and third electrodes 4a and 4c, amplified by the amplifier 8, and applied to the diagnostic circuit 31. The diagnostic circuit 21 also receives the diagnostic pulse signal from the pulse generation circuit 20, and it determines if the sensor output signal to be a rated is based upon a diagnostic pulse signal. Upon determination of the rated sensor output signal, i.e., the sensor 5 is proved normal, the diagnostic circuit 21 turns on the indicator lamp 22, allowing the vehicle user to confirm the normal operation of the piezoelectric acceleration sensor 5.

If on the other hand, the sensor 5 is in an abnormal state, the piezoelectric element 3 will not be properly distorted in response to the diagnostic pulse signal from the pulse generation circuit 20, or at most, the distortion will not be proportional to the amplitude of the input pulse. Accordingly, the element 3 will not generate a piezoelectric voltage in proportion to the diagnostic pulse signal. Thus, the sensor 5 will not provide an output signal or at most, will provide a false signal which does not meet the condition based on the diagnostic pulse signal. In response to the absence of the sensor output signal or to the reception of a false sensor output signal, the diagnostic circuit 21 determines the sensor 5 to be abnormal and maintains the indicator lamp 22 unlighted, thereby notifying the vehicle user that the piezoelectric acceleration sensor has failed. Thus, the second and fourth electrodes 4b and 4d, pulse generation circuit 20, diagnostic circuit 21 and indicator lamp 22 in combination form a self-diagnostic circuit for the sensor 5.

One possible problem with the diagnostic circuit is that the output signal of the sensor 5 in the diagnostic operation might leak into the airbag operation circuit, causing the inflator 11 to go off erroneously. In order to avoid such a malfunctioning, the system is designed so that the arithmetic circuits 9 and/or 14 do not respond to the output signal of the sensor 5 during the diagnostic operation, and thus, do not produce output signals to the drive circuits 10 and/or 15. This requirement is fulfilled by designing the pulse generation circuit 20 to produce a diagnostic pulse signal with relatively small voltage amplitude so that the sensor 5 also produces a relatively small output signal in the diagnostic operation. The characteristics of the arithmetic circuits 9 and 14 are selected such that the circuits provide outputs for the drive circuits 10 and 15 only when receiving a sensor output signal above a predetermined threshold attributable to the collision of vehicle as mentioned previously.

Figure 6:
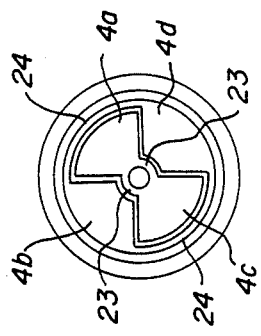
FIG. 6 is a plan view of a piezoelectric acceleration sensor of a second embodiment of the present invention.

FIG. 6 is a plan view of the piezoelectric acceleration sensor of another embodiment of the present invention. Component parts identical to those shown in FIG. 4 are given the common symbols and their explanation will be omitted.

As shown in FIG. 6, the first electrode 4a and third electrode 4c are connected electrically through a pair of first bridges 23. Similarly, the second electrode 4b and fourth electrode 4d are connected electrically through a pair of second bridges 24. With this structure, when the sensor 5 is included in the airbag operation circuit as shown in FIG. 5, the sensor output signal is delivered even if one of the output wires 6 and 7 running from the first and third electrodes 4a and 4c is broken. In this case, the live wire carries the voltage generated on both first and third electrodes 4a and 4c, and the sensor 5 is not degraded in its performance. Namely, the piezoelectric sensor 5 of this embodiment has redundancy through the connection of the first and third electrodes 4a and 4c on which the output wires 6 and 7 are connected respectively. This redundant electrode design is also applied to the second and fourth electrodes 4b and 4d, so that even if one of the input wires 18 and 19 is broken, the diagnostic pulse signal is surely supplied to both electrodes 4b and 4d through a live wire, and the performance of the sensor 5 is retained.

Accordingly, the piezoelectric acceleration sensor 5 has a self-diagnostic function in addition to the acceleration sensing function. The diagnostic function allows the vehicle user to inspect the sensor 5 by application of the diagnostic pulse signal to the sensor 5 without removing it from the vehicle. The additional pulse generation circuit 20, diagnostic circuit 21 and indicator lamp 22 do not take much space and they can readily be incorporated into the airbag operation circuit. The inventive acceleration sensing system eliminates the need of a vibrator for testing the sensor 5 and need for removing the sensor from the vehicle, whereby the sensor 5 can be inspected easily at any time and it can thus, constantly retain normal operation.

Although in the foregoing embodiment the electrode 4 is divided into four segments, the present invention is not confined to this example, but the number of segment electrodes can be determined arbitrarily. For example, the electrode 4 may be split into two segments, in which case one is used for the output of the piezoelectric voltage signal and the other for the input of the diagnostic pulse signal. However, a two segment electrode design does not permit redundant wiring for input and output signals and, therefore, the electrode 4 is preferably divided into at least four segments for enhanced system reliability.

Although in the foregoing embodiment, the piezoelectric acceleration sensor 5 is used in the airbag operation circuit, the sensor can also be used for other control circuits in a vehicle where an acceleration signal is needed, and can also be used for the instrumentation of acceleration in general.

According to the present invention, as will be appreciated from the above description, the piezoelectric element in an acceleration sensor has its electrode divided into multiple segments, part of which is assigned to output terminals for outputting the piezoelectric voltage signal, with remaining segments are used as input terminals for receiving a diagnostic voltage signal. The sensor, thus, has the capability of detecting the acceleration of a moving body and inspecting the sensor itself. The piezoelectric element generates a voltage in proportion to the acceleration of a moving body, and the voltage is fed from the element through the output terminals, thereby detecting the acceleration of the moving body. When the sensor has an electrical diagnostic signal applied to the electrode segments which function as input terminals, the piezoelectric element is distorted, and it delivers a voltage signal attributable to the distortion of the element through the output terminals, which provides a determination of sensor normality on a simple correlation basis between the piezoelectric voltage and diagnostic voltage signal.

Consequently, the sensor can easily and quickly be inspected at any time without the need of detachment from the vehicle. Moreover, the inventive sensor does not necessitate a special testing tool such as a vibrator for applying the specified impact, whereby the vehicle user is free from such an extra expenditure.

The piezoelectric acceleration sensor and associated self-diagnostic circuit can readily be included in the operation circuit of a control system such as an airbag system without taking a significant space.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

We claim:

1. A collision detection system for a vehicle comprising:
    an acceleration sensor for sensing the acceleration and deceleration of the vehicle wherein said acceleration sensor is a piezoelectric sensor;
    signal processing means coupled to said piezoelectric sensor for generating a first output when the vehicle deceleration is greater than a predetermined amount; and
    diagnostic pulse generator means coupled to said piezoelectric sensor for applying a diagnostic pulse during starting of said vehicle and during operating of said vehicle to said piezoelectric sensor for distorting said piezoelectric sensor, therein causing said piezoelectric sensor to generate an electrical output, said electrical output being applied to said signal processing means wherein said signal processing means produces a second output in response thereto,
    said signal processing means includes a circuit means for decreasing a length of time said second output of said signal processing means in response to said diagnostic pulse applied to said piezoelectric sensor.

2. A collision detection system as set forth in claim 1, wherein said signal processing means includes a first comparator means for producing an output when the signal applied thereto is greater than a predetermined amount and wherein said circuit means includes a second comparator means and a timer means connected in parallel with said first comparator means, said second comparator means producing an output when the signal applied thereto is less than the first predetermined amount and greater than a second predetermined amount, the output of said second comparator means being applied to said timer means, said timer means producing an output in response thereto having a time period for decreasing the length of time of the first output.

3. A collision detection system as set forth in claim 1, wherein said acceleration sensor comprises a housing mounted on the vehicle and a pendulum supported in said housing and movable relative thereto wherein said piezoelectric sensor is mounted on said pendulum such that when the vehicle decelerates, said pendulum is moved relative to said housing therein distorting said piezoelectric sensor wherein said piezoelectric sensor produces an electrical output as a function of the distortion.

4. A collision detection system as set forth in claim 3, wherein said piezoelectric sensor comprises electrode means, said electrode means being divided into a plurality of electrode segments, wherein at least one of said electrode segments is an output electrode connected to the input of said signal processing means and wherein at least one of said electrode segments is an input electrode connected to the output of said diagnostic pulse generator means.

5. A collision detection system as set forth in claim 4, wherein said plurality of electrode segments comprises four electrode segments, two of said electrode segments being input electrodes and two of said electrode segments being output electrodes.

6. A collision detection system as set forth in claim 5, wherein said two output electrodes are positioned on opposite sides of said piezoelectric sensor and said two input electrodes are positioned on opposite sides of said piezoelectric sensor.

7. A collision detection system as set forth in claim 5, wherein said piezoelectric sensor includes second connection means for connecting said two input electrodes.

8. A collision detection system as set forth in claim 5, wherein said piezoelectric sensor includes second connection means for connecting said two input electrodes.

9. A piezoelectric acceleration/deceleration sensing device comprising:
    a housing for mounting on an object;
    a pendulum supported in said housing and movable relative to said housing; and
    a piezoelectric sensor mounted on said pendulum such that when the object accelerates or decelerates, said pendulum moves relative to said housing therein distorting said piezoelectric sensor, so that said piezoelectric sensor produces an output as a function of the distortion, said piezoelectric sensor includes an electrode means, said electrode means being divided into a plurality of electrode segments, at least one of said electrode segments is an output electrode means for providing an electrical signal as a function of the distortion of said piezoelectric sensor, and at least one of said electrode segments, which is insulated from the at least one of the electrode segments which is the output electrode means, is an input electrode means for receiving an electrical signal and for distorting said piezoelectric sensor in response thereto.

10. A collision detection system as set forth in claim 9, wherein said plurality of electrode segments comprises four electrode segments, two of said electrode segments being input electrode means and two of said electrode segments being output electrode means.

11. A collision detection system as set forth in claim 9, wherein said two output electrode means are positioned on opposite sides of said piezoelectric sensor and said two input electrode means are positioned on opposite sides of said piezoelectric sensor.

12. A collision detection system as set forth in claim 9, wherein said piezoelectric sensor includes first connection means connecting said two output electrode means.

13. A collision detection system as set forth in claim 9, wherein said piezoelectric sensor includes second connection means for connecting said two input electrode means.

* * * * *